US010797421B2

(12) United States Patent
Doody et al.

(10) Patent No.: US 10,797,421 B2
(45) Date of Patent: Oct. 6, 2020

(54) LANDING ELECTRICAL CONTACT

(71) Applicant: XEROX CORPORATION, Norwalk, CT (US)

(72) Inventors: Michael A. Doody, Manchester, NY (US); Jeffrey M. Fowler, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 276 days.

(21) Appl. No.: 15/987,784

(22) Filed: May 23, 2018

(65) Prior Publication Data
US 2019/0363471 A1  Nov. 28, 2019

(51) Int. Cl.
G06F 21/00 (2013.01)
H01R 13/24 (2006.01)
G06F 21/85 (2013.01)
H01R 12/77 (2011.01)

(52) U.S. Cl.
CPC ......... H01R 13/2407 (2013.01); G06F 21/85 (2013.01); H01R 12/771 (2013.01)

(58) Field of Classification Search
CPC ... H01R 13/2407; H01R 12/771; G06F 21/85; G06K 7/0026
See application file for complete search history.

(56) References Cited

U.S. PATENT DOCUMENTS

| 5,583,445 | A | * | 12/1996 | Mullen | G01R 31/311 |
| | | | | | 324/754.23 |
| 9,886,571 | B2 | | 2/2018 | Caporale et al. | |
| 9,934,415 | B1 | | 4/2018 | Fowler et al. | |
| 2007/0206364 | A1 | * | 9/2007 | Swei | H05K 3/281 |
| | | | | | 361/748 |
| 2013/0043888 | A1 | * | 2/2013 | Soar | F41J 5/14 |
| | | | | | 324/655 |
| 2015/0025358 | A1 | * | 1/2015 | Emaci | A61B 5/0555 |
| | | | | | 600/411 |
| 2016/0072554 | A1 | * | 3/2016 | Sharma | H04W 4/80 |
| | | | | | 455/41.1 |

(Continued)

OTHER PUBLICATIONS

Thomenius et al., "Reconfigurable mosaic annular arrays", IEEE Transactions on Ultrasonics, Ferroelectrics, and Frequency Control, vol. 61, Issue: 7, Jul. 2014.*

(Continued)

*Primary Examiner* — Morshed Mehedi
(74) *Attorney, Agent, or Firm* — MH2 Technology Law Group LLP

(57) ABSTRACT

A reader suitable for reading data from a printed memory device attached to a curved surface includes a flexible wiring assembly that can be repositioned from a first position having a first profile into a second position having a second profile. In the first position, electrical contacts of the reader do not electrically couple with contact pads of the printed memory device, while in the second position the electrical contacts of the reader electrically couple to the contact pads of the printed memory. In one implementation, the flexible wiring assembly includes a flexible underlayer that supports the plurality of electrical contacts. In another implementation, the flexible wiring assembly includes a rigid first portion and a rigid second portion that pivot about a pivot point.

18 Claims, 12 Drawing Sheets

(56) References Cited

U.S. PATENT DOCUMENTS

2017/0277295 A1* 9/2017 Reynolds .............. G06F 3/0412
2017/0345886 A1* 11/2017 Yi .................... H01L 27/10814

OTHER PUBLICATIONS

Extended European Search Report dated Oct. 14, 2019 in corresponding European Application No. 19175265.8, 8 pages.
Author Unknown, "ThinFilm Memory Label for Brand Protection," sales catalogue (2 pages), 2014.
Author Unknown, "Xerox Launches Printed Memory Products to Combat Counterfeiting," https://www.news.xerox.com/news/Xerox-Launches-Printed-Memory-to-Combat-Counterfeiting, (2 pages) Sep. 15, 2015.

* cited by examiner

LANDING ELECTRICAL CONTACT

TECHNICAL FIELD

The present teachings relate to the field of memory devices and product marking, for example, products including a tag or label for authentication and/or inventory control and, more particularly, to readers and scanners for reading and/or writing data from/to a product marked with an electronic memory, tag, or label.

BACKGROUND

Xerox Printed Memory is a highly secure printed label including rewritable memory. In one exemplary use, the labels may be used for authentication to determine whether a product is authentic or genuine to prevent counterfeiting. For example, the printed memory may be attached as a label onto a subassembly of a customer-replaceable unit such as various consumable components, supplies, shipment packaging, consumer products, documents, etc. Data from the printed memory may be read, for example, after installation of the unit to which it is attached into a host device and compared to an expected result or value. If the value read from the printed memory matches the expected value, circuitry within the host device allows the host device to function. If the value read from the printed memory does not match the expected value, the circuitry disables functionality of the host device until an authentic or genuine unit is installed.

In another implementation, Xerox Printed Memory may be used to track a product through a manufacturing process and/or a supply chain. The labels can be programmed to mark individual items with a unique electronic identifier that may be verified with a scanner. Other uses for Xerox Printed Memory are contemplated including, but not limited to, smart consumables where an object is associated with data that is later used by a base unit to improve or optimize performance, consumption records where bulk usage of a product supply is tracked, tracking of items or people outside of an manufacturing environment, etc.

A Xerox Printed Memory includes a layer of ferroelectric or ferrite material (i.e., a ferroelectric layer) positioned between a plurality of wiring lines (e.g., word lines and bit lines). A region of the ferroelectric layer situated between each bit line and word line forms a memory cell. The memory may be written with one of two digital memory states by applying a suitable write voltage to the wiring lines. The memory state may be read by applying a suitable read voltage to the wiring lines through electrical contacts (e.g., landings or landing pads).

Various manufacturing processes may be used to form the ferroelectric material. Depending on the manufacturing process used, the printed memory device will display particular electrical characteristics. For example, for a given read voltage, different compositions of the ferroelectric layer return different output values. The manufacture and composition of the memory itself is difficult to counterfeit and provides secure and reliable anti-counterfeiting measures and reliable product tracking.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An electrical device reader according to an implementation of the present teachings can include a wiring assembly having a flexible substrate and a plurality of electrical contacts supported by the flexible substrate. The device reader can further include an electrical connector electrically coupled with the plurality of electrical contacts, wherein the wiring assembly is configured to flex from a first profile in which the plurality of electrical contacts are not electrically coupled with a plurality of contact pads of an electrical device into a second profile in which the plurality of electrical contacts are electrically coupled with the plurality of contact pads of the electrical device.

Optionally, the first profile can be a flat profile and the second profile can be a curved profile. The electrical device reader can further include a cradle positioned relative to the electrical connector and having a curved surface that defines a recess in the cradle, wherein the wiring assembly is configured to flex and conform to the curved surface of the cradle into a curved profile during a transfer of data from and/or to an electrical device through the wiring assembly. The cradle can define a first channel and a second channel and the electrical connector can include a first tab and a second tab, where the first tab is positioned within the first channel, the second tab is positioned within the second channel, and the first and second tabs are configured to slide within the first and second channels. The electrical connector can be configured to slide back and forth within the recess defined by the curved surface of the cradle.

The flexible substrate can include a flexible underlayer, wherein the flexible underlayer includes one or more of a synthetic foam, a urethane foam, a urethane foam rubber, and felt.

In an implementation, the electrical connector can include a first carriage and a second carriage, the cradle can include a first slot and a second slot, and the first and second carriages can be positioned within the first and second slots, thereby constraining movement of the electrical connector relative to the cradle along a path.

The flexible substrate can include a rigid first portion and at least a rigid second portion, and the rigid first portion and the rigid second portion can be configured to articulate between a first position having the first profile and a second position having the second profile. The electrical device can further include a positioner that elastically maintains the wiring assembly in the first position having the first profile. The plurality of electrical contacts can include a plurality of spring-loaded electrical contacts. The electrical device reader can further include a driver mechanism configured to reposition the wiring assembly from the first position to the second position.

The electronic device reader described above can be part of an electronic device, wherein the electronic device further includes a replaceable component having a curved surface and an electrical device attached to the curved surface of the replaceable component and having a curved profile. The wiring assembly of the electronic device reader can be configured to flex from a first profile in which the plurality of electrical contacts are not electrically coupled with a plurality of contact pads of the electrical device into a second profile in which the plurality of electrical contacts are electrically coupled with the plurality of contact pads of the electrical device.

A method for authenticating a replaceable component of a host device can include positioning a wiring assembly in a first position adjacent to a curved printed memory, wherein a plurality of electrical contacts of the wiring assembly do not electrically couple with a plurality of contact pads of the curved printed memory, and the wiring assembly has a first profile in the first position and repositioning the wiring assembly into a second position, wherein the plurality of electrical contacts of the wiring assembly are electrically coupled with the plurality of contact pads of the curved printed memory and the wiring assembly has a second profile in the second position. Further, with the plurality of contact pads electrically coupled to the plurality of electrical contacts, data can be read from the curved printed memory. The method can further include comparing the data read from the curved printed memory to expected data. Responsive to the data read from the curved printed memory matching the expected data, functionality of the host device can be enabled and, responsive to the data read from the curved printed memory not matching the expected data, functionality of the host device can be disabled.

The repositioning of the wiring assembly into the second position can include flexing a flexible underlayer of the wiring assembly from a flat profile to a curved profile.

The repositioning of the wiring assembly into the second position can include articulating a rigid first portion of the wiring assembly and at least a second rigid second portion of the wiring assembly between the first position and the second position, and can further include engaging the rigid first portion and the rigid second portion with a driver mechanism thereby repositioning the rigid first portion and the rigid second portion from the first position to the second position and repositioning the wiring assembly from the second position into the first position using a positioner that elastically maintains the rigid first portion and the rigid second portion in the first position.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

As used herein, "data" refers to any type of information, signals, or results that are obtained from or sent to an electrical device such as a memory device, an integrated circuit, or another electrical device, or any information obtained from monitoring, interrogating, querying, or measuring, etc., an electrical device. The term "data" includes digital data, analog data, voltage values, current values, resistance values, vector values, scalar values, and/or flux values.

Figure 1:
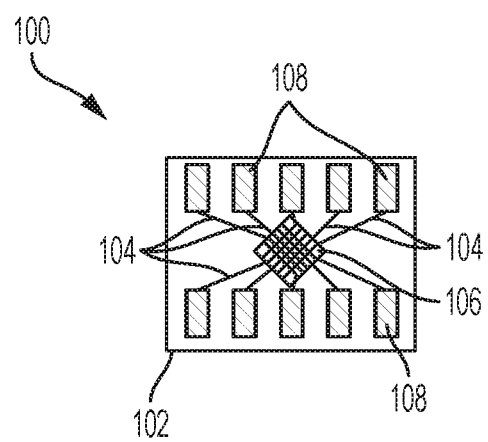
FIG. 1 is a plan view of a memory device, for example, a printed memory such as a Xerox Printed Memory.

An example of a memory device 100, for example, a printed memory (printed memory device) 100 such as a Xerox Printed Memory 100 is depicted in the plan view of FIG. 1. The structure and function of the Xerox Printed Memory 100 is known, and is only briefly discussed herein. The FIG. 1 printed memory 100 includes a substrate 102, for example, a flexible dielectric substrate 102, such as a flexible polymer substrate, that may include an adhesive backing layer to aid in attachment of the printed memory 100 to a surface of a product, a plurality of wiring lines (e.g., word lines and bit lines) 104 and a ferroelectric layer 106 directly interposed or positioned between the word lines and the bit lines. A memory cell that stores the logic bit or logic state is provided by and within the ferroelectric layer 106 at the physical location that is interposed between the intersection of each word line and bit line. It will thus be appreciated that the word lines and bit lines do not physically intersect, but are physically separated by the ferroelectric layer 106. The printed memory 100 depicted in FIG. 1 includes 10 wiring lines 104 (five word lines and five bit lines), and thus the FIG. 1 device includes 25 memory cells and may thus store 25 bits of information. Each wiring line 104 terminates in a contact pad 108. It will be appreciated that a Xerox Printed Memory may include other structures that are not described or depicted for simplicity, while various depicted structures may be removed or modified. Each memory cell of the printed memory 100 may be read by applying a suitable read voltage to two of the wiring lines 104 (i.e., to one word line and one bit line) and measuring an electrical response. To apply the read voltage, the plurality of contact pads 108 can be physically and electrically contacted with probe contacts of a reader. A voltage is applied across the contact pads 108 through probe contacts, and the resulting response is measured. Each memory cell may individually addressed during a read or write cycle, and two or more, or all, of the memory cells in the memory array may be read or written simultaneously or serially.

The contact pads 108 of the printed memory 100 and other electrical devices can be formed using a carbon-impregnated composite, electrically conductive inks such as silver nanoparticle ink, or one or more other suitable materials. When the contact pads 108 are provided on a flat, planar, or near-planar surface, the probe contacts of the reader can be placed into physical contact with the contact pads 108 in a direction that is perpendicular to the plane of the contact pads 108, thereby minimizing wear or scratching from the physical contact. However, being physically flexible, the printed memory 100 may be placed onto arcuate or curved surfaces. Physically contacting the contact pads 108 with probe pads when the printed memory 100 is placed onto a curved surface can result in accelerated wear of the contact pads 108 as the probe contacts slide into place across and onto contact pads 108. The rate of wear and/or scratching may be increased as the radius of the curved surface to which the printed memory 100 is attached decreases, for example, because the smaller radius results in a smaller contact area and thus larger contact pressure or contact stress.

An implementation of the present teachings provides a reader that may be used with printed memory 100, such as Xerox Printed Memory 100, or another memory device or electrical device. The reader can be a standalone device such as a handheld reader, or can be integrated as a subsystem of another electronic host device such as a printer. In one implementation, the printed memory 100 can be placed onto a curved surface, such as an exterior surface of a toner bottle, and used as a toner bottle anti-counterfeiting measure. The printed memory 100 can be read by the reader, where the reader is a subsystem of the printer to confirm that an installed toner bottle is genuine (e.g., is not a counterfeit or a gray market product). A controller and circuitry within the printer can enable printer functionality if the toner bottle is determined to be genuine, or can disable printer functionality if the toner bottle is determined to be counterfeit or gray market.

FIGS. 2-9 depict various reader components in accordance with an implementation of the present teachings. While the figures depict various structures and features of a possible implementation of the present teachings, it will be appreciated that this or other designs may include other structures and/or features that are not depicted, while various depicted structures and/or features may be removed or modified.

Figure 2:
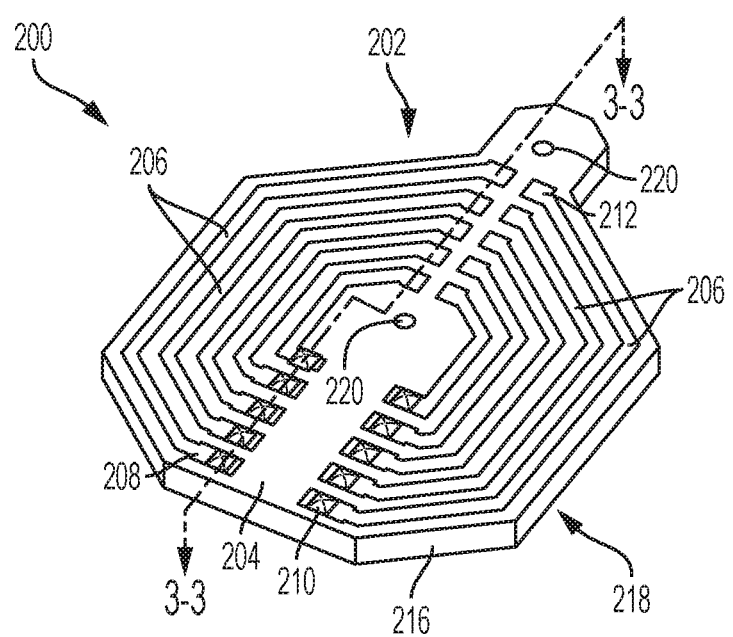
FIG. 2 is a perspective depiction of a wiring assembly according to an implementation of the present teachings.
Figure 3:
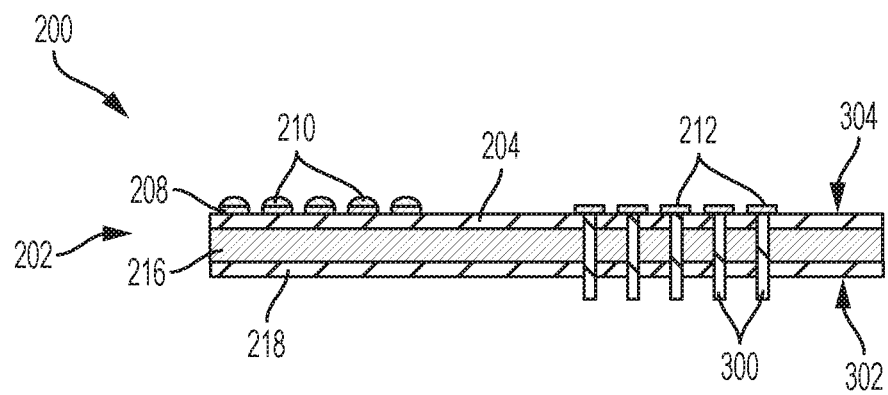
FIG. 3 is a cross section of the FIG. 2 wiring assembly.

FIG. 2 is a perspective depiction, and FIG. 3 is a cross section along 3-3 of FIG. 2, of a wiring assembly 200, such as a printed wiring assembly, for a reader in accordance with an implementation of the present teachings. The wiring assembly 200 includes a flexible circuit 202 that includes a substrate 204 and a plurality of electrically conductive interconnects or traces 206 formed on the substrate 204. The substrate 204 is a flexible electrically insulative material, for example, a polymer such as a polyimide. The traces 206 can be or include an electrically conductive material such as a metal, a metal alloy, a conductive ink, etc.

A first end of each trace 206 can terminate a contact pad (e.g., a first contact pad) 208 having an electrical contact 210 formed thereon that will make physical and electrical contact with the contact pads 108 of the printed memory 100. Each electrical contact 210 can be or include, for example, a conductive bump formed at least partially from a solder material, a metal-filled epoxy, or another electrically conductive material. etc. In another implementation, each electrical contact 210 can be or include a spring-loaded connector, a probe tip, an anisotropic elastomeric interconnect, or another type of electrical contact 210.

A second end of each trace 206 opposite the first end can also terminate a contact pad (e.g., a second contact pad) 212. The second end of each trace can be electrically coupled to an electrically conductive stud or via 300 at an underside of each contact pad 212. The conductive via 300 extends from the underside of the of the contact pad 212 to a back surface 302 of the wiring assembly 200 as depicted in FIG. 3 and facilitates the electrical coupling of each contact pad 212 with a connector and cable as described below. As depicted in FIG. 3, the back surface 302 of the wiring assembly 200 is opposite a front surface 304, where the front surface 304 includes traces 206.

The wiring assembly 200 can further include a flexible substrate or flexible underlayer 216 attached to, and supporting, the flexible circuit 202 including the electrical contacts 210. In an implementation, the flexible underlayer 216 can include a foam layer or polymer core layer that bends, flexes, or is compliant when placed under pressure. The flexible underlayer 216 can be or include a synthetic material, for example, a synthetic foam such as a urethane foam or a urethane foam rubber, or another material such as felt or another natural or synthetic flexible material. The conductive vias 300 can traverse through openings in the flexible underlayer 216 and extend from a back surface 302 of the wiring assembly 200 as depicted in FIG. 3. In another implementation, electrical connectors can be incorporated with an articulated flexible circuit having spring-loaded or telescoping electrical contacts, where the articulated flexible circuit conforms to a shape of a structure to which the printed memory 100 is attached, for example, as discussed below relative to FIGS. 17-19.

The wiring assembly 200 can optionally include a backing 218 such as a flexible, low-friction backing that provides low sliding friction and added wear resistance to the back surface 302 of the wiring assembly 200 during use of the reader as described below. As used herein, a "low-friction" backing 218 refers to a structure where a coefficient of friction of the material of the backing 218 is less than a coefficient of friction of the material of the flexible underlayer 216. The backing 218 can be or include a synthetic material such as a polyamide film or polyethylene terephthalate film, for example a nylon film or a Mylar® film, having a thickness of from about 0.002 inches (0.05 millimeters) to about 0.025 inches (0.6 millimeters). The backing 218 may contribute to a stiffness of the wiring assembly 200. The wiring assembly 200 may be excessively stiff if the backing 218 is too thick. Insufficient thickness of the backing 218 may lead to failure of the backing during use if the backing is worn through by physical contact with the cradle 402 or is otherwise damaged through contact with the cradle 402 in such a way as to impair its function.

Additionally, the wiring assembly 200 can include one or more optional mounting features that assist in mounting and/or aligning the wiring assembly 200 to an electrical connector as described below. For example, the wiring assembly 200 can include one or more mounting holes 220 as mounting features, although other types of mounting features and techniques for mounting the electrical connector to the wiring assembly 200 are contemplated.

Figure 4:
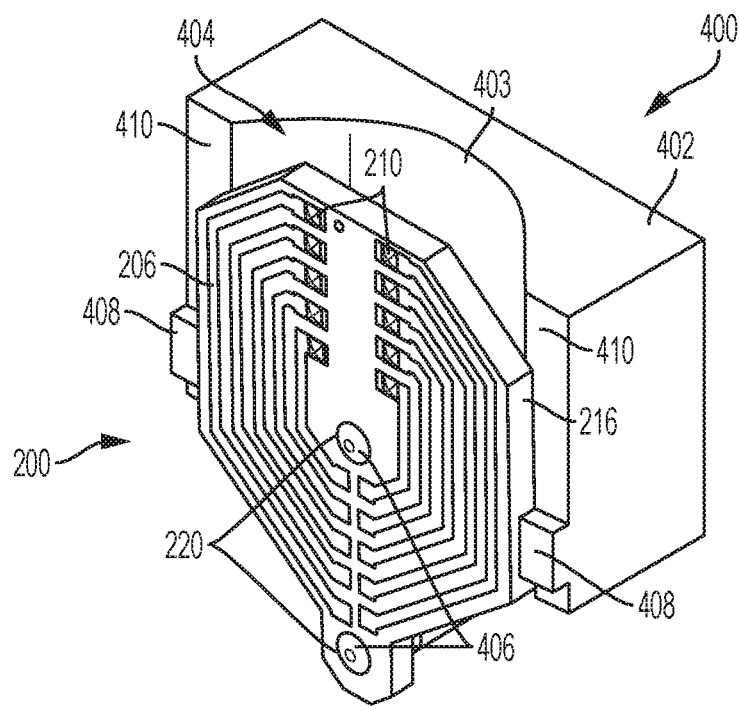
FIG. 4 is a perspective depiction of a portion of a reader in accordance with an implementation of the present teachings.
Figure 5:
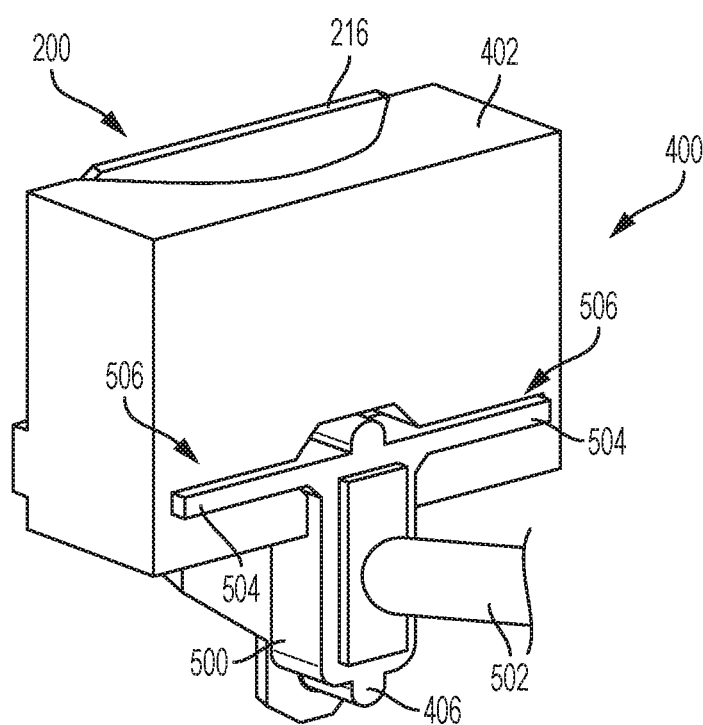
FIG. 5 is another perspective depiction of the FIG. 4 structure.

In addition to the wiring assembly 200, the reader 400 can further include a cradle 402 that may be attached to, or otherwise positioned adjacent to, the wiring assembly 200 as depicted in the perspective depictions of FIGS. 4 and 5. In this implementation, the cradle 402 includes a surface 403 such as a curved surface that defines a recess 404 having a shape that is suitable to receive the structure to which the printed memory 100 is attached. In this non-limiting example implementation, the printed memory 100 is attached to an exterior convex surface of a toner bottle having a radius, and thus the surface 403 and the recess 404 defined thereby has a concave shape as depicted, with a radius that is suitable to receive the surface of the toner bottle.

As depicted in FIGS. 4 and 5, the reader 400 can also include a connector 500, such as an electrical connector, physically and/or electrically attached to and/or integrated with the wiring assembly 200. In some implementations, the connector 500 can be physically connected to the cradle 402 such that it is moveably attached to the cradle 402, such as slidably attached to the cradle 402, or the connector 500 can be fixedly attached to the cradle 402. The connector 500 may be constrained to move in a particular way relative to the cradle 402. In particular, the connector 500 may be constrained to slide along a path relative to the cradle 402. The connector 500 can be electrically coupled to each via 300 of the plurality of vias 300. Additionally, the connector 500 may be electrically coupled to a cable 502 that is used to route electrical signals, data, or other information between the printed memory 100 and other reader circuitry, such as a host controller 1604 (FIG. 16), during use as described below. In an implementation, the connector may include a mass-produced and/or commercially available connector positioned within a custom housing such as a custom plastic housing.

To facilitate alignment between the connector 500 and the cradle 402, the connector 500 can include one or more arms or carriages 504 that are received by slots 506 defined by the cradle 402 as depicted in FIG. 5, where the carriages 504 are positioned within the slots 506. FIG. 5 depicts first and second carriages 504 and first and second slots 506. The slots 506 are shaped to position the carriages 504, and thus the connector 500, relative to the cradle 402. Furthermore, the connector 500 may include one or more pegs 406 such as heat stakes received by the mounting holes 220 as depicted in FIG. 4, which mount the wiring assembly 200 onto the connector 500 and the cradle 402, and position the circuit assembly 200 relative to the cradle 402. The pegs 406 can be offset from the printed memory 100 and the structure to which the printed memory 100 is attached. In another implementation, the pegs 406 can be, include, or be functionally replaced by, one or more rivets, screws, adhesives, etc. In another implementation, each peg 406 may extend into a recess (not depicted for simplicity) in the structure to which the printed memory 100 is attached. The cradle 402 can include alignment tabs 408 that also assist to laterally position the wiring assembly 200 on the cradle 402. The back surface 302 of the wiring assembly 200 can rest on a front face 410 of the cradle 402.

Figure 6:
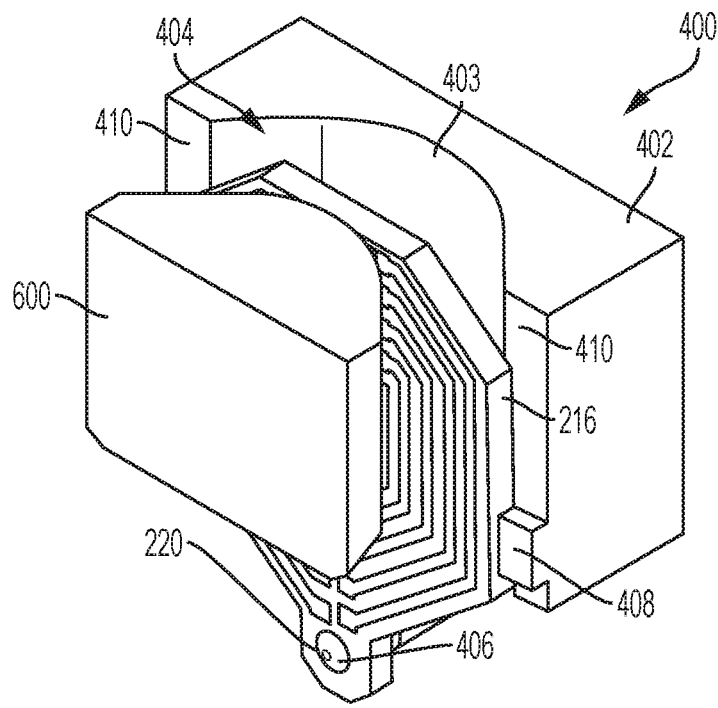
FIG. 6 is a perspective depiction of the reader of FIG. 4 in preparation for a read of a printed memory device attached to a structure.
Figure 7:
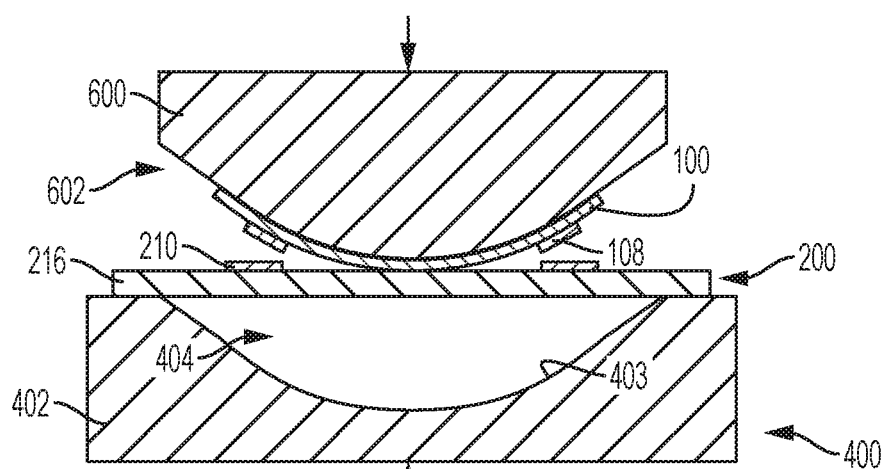
FIG. 7 is a cross section of the FIG. 6 device.
Figure 8:
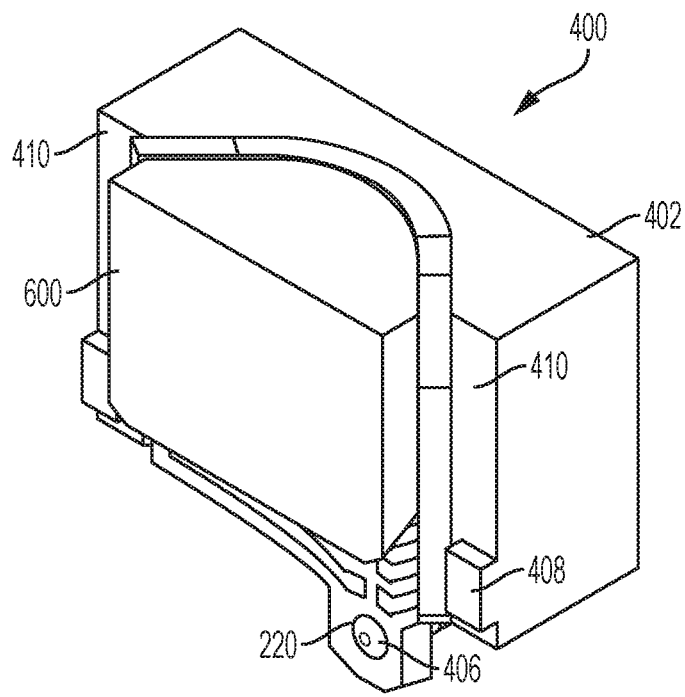
FIG. 8 is a perspective depiction of the FIG. 6 device where the printed memory and reader are positioned for a read operation.
Figure 9:
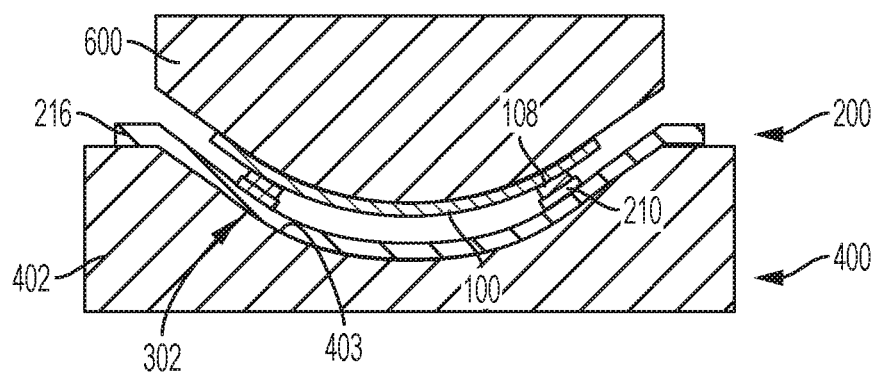
FIG. 9 is a cross section of the FIG. 8 device.
Figure 16:
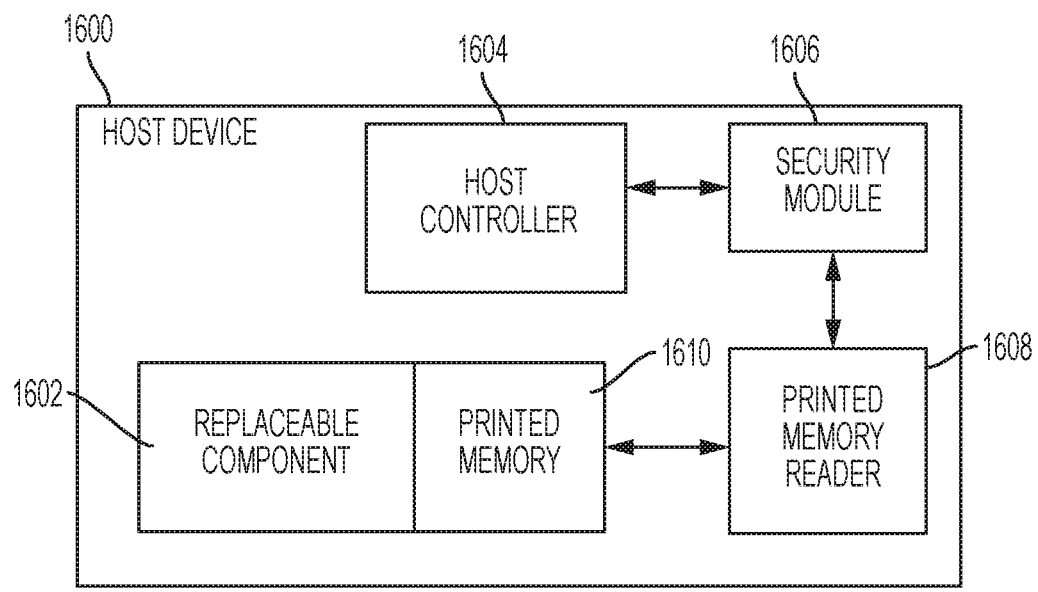
FIG. 16 is a schematic depiction of a host device including a reader in accordance with an implementation of the present teachings.

FIG. 6 is a perspective depiction, and FIG. 7 is a cross section, of a portion of an article or structure 600 such as a replaceable component having a curved surface 602 to which a printed memory 100 is attached. The depictions of FIGS. 6 and 7 are during an initial physical (but not electrical) contact of the printed memory 100 with the wiring assembly 200, in preparation for a read cycle of the printed memory 100. As depicted in FIG. 7, the structure 600 and the wiring assembly 200 are brought in contact with each other, through movement of the structure 600, the reader 400, or both. As the structure 600 and the wiring assembly 200 are brought together, a surface of the printed memory 100 on the curved surface 602 physically contacts the wiring assembly 200 between electrical contacts 210. At this point, the electrical contacts 210 and the contact pads 108 do not physically or electrically contact each other. As the structure 600 and the wiring assembly 200 continue to be brought together, wiring assembly 200 bends or flexes and begins to conform to the shape of the curved surface 602 of the structure 600. The electrical contacts 210 and the contact pads 108 physically and electrically contact each other and, as the wiring assembly 200 continues to flex, the electrical contacts 210 roll into place onto the contact pads 108, until the electrical contacts 210 and the contact pads 108 are in complete physical and electrical contact with each other. The wiring assembly 200 thus flexes from a first flat profile as depicted in FIG. 7 to a second curved profile as depicted in FIG. 9. As depicted particularly in FIG. 9, the back surface 302 of the wiring assembly 200 conforms to, and physically contacts, the surface 403 of the cradle 402 that defines the recess 404. Once a predetermined compressive force is applied between the structure 600 and the reader 400, and more particularly between the contact pads 108 of the printed memory 100 and the electrical contacts 210 of the wiring assembly 200 (i.e., generally, a compressive force in the direction of the arrows depicted in FIG. 7), a memory operation such as a read operation can be performed on the printed memory 100. Once electrical connection is established between the contact pads 108 and the electrical contacts 210, a complete electrical pathway may extend, or can be formed, from and/or between the ferroelectric layer 106, to the wiring lines 104, to the contact pads 108, to the electrical contacts 210, to the traces 206, to the vias 300, to the connector 500 to the cable 502, and to the controller such as the host controller 1604 (FIG. 16).

The flexible and compliant wiring assembly 200 allows for electrical connection of the electrical contacts 210 to the contact pads 108 of the printed memory 100 in a direction generally perpendicular to the printed memory 100 without sliding the electrical contacts 210 across the contact pads 108, which could wear or damage the contact pads 108. The compliant wiring assembly 200 wraps around the curved shape of the structure 600 and the printed memory 100 attached thereto as physical and electrical contact is made to the printed memory 100. In contrast, electrical contacts of a permanently curved wiring assembly would slide across the contact pads 108 of the printed memory 100, thereby contributing to wear and possible damage of the contact pads 108.

The reader 400 of FIGS. 4-9, and more particularly the wiring assembly 200 of the reader 400, physically contacts the printed memory 100 when at least one of the wiring assembly 200 and the printed memory 100 is moving in a generally perpendicular direction toward the other.

Figure 10:
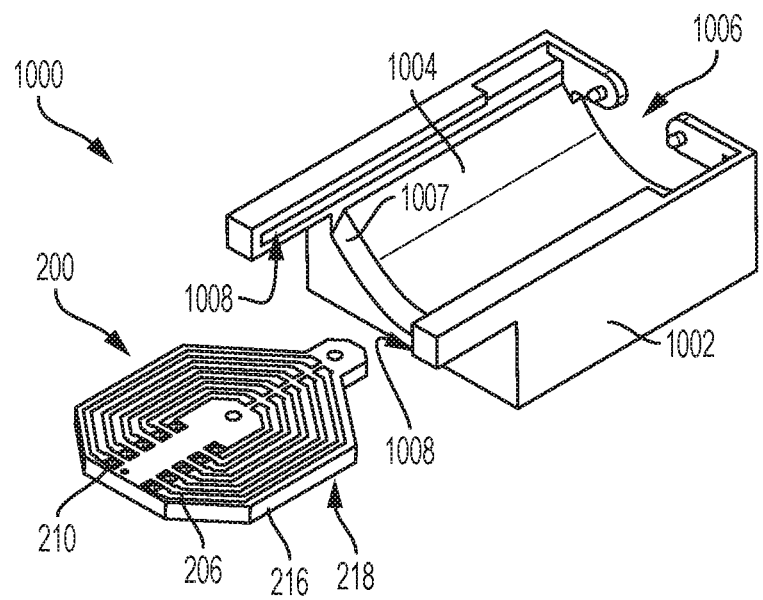
FIG. 10 is a perspective depiction of a reader portion in accordance with another implementation of the present teachings.

Another implementation of the present teachings is depicted in FIGS. 10-15. FIG. 10 depicts a part of a reader 1000, including wiring assembly 200 as described herein and a cradle 1002. The cradle 1002 includes a surface 1004 such as a curved surface that defines a recess 1006. The cradle 1002 can further include an angled surface 1007 that intersects the curved surface 1004 at an incline or oblique angle, for example, at an angle of from about 10° to about 75°, or from about 15° to about 60°. Inclusion of the optional angled surface 1007 may reduce wear of the back surface 302 of the wiring assembly 200 and/or may guide the wiring assembly 200 more precisely onto the curved surface 1004. The angled surface 1007 can thus control the motion of the wiring assembly 200 into the curved surface 1004 of the cradle 1002 to achieve a desired final position from a wider range of initial positions, or to make the transition from an initial position to a final position more smooth or gentle, thereby reducing wear and tear on the wiring assembly 200 and/or the cradle 1002. It will be appreciated that the angled surface 1007 can be, for example, a chamfer (i.e., a straight line or planar surface), a fillet (i.e., a circular or elliptical arc), or may have a specialized profile suitable for the specific device design. During use of the reader 1000, the back surface 302 of the wiring assembly 200 may slide across the angled surface 1007 and onto the curved surface 1004. In this implementation, the back surface 302 of the wiring assembly 200 may be provided by the flexible low-friction backing 218 described above to further reduce wear of the wiring assembly 200 during one or more read operations of one or more printed memories 100 by the reader 1000. The cradle 1002 can include and define other features, such as a pair of opposing slots or channels (i.e., a first channel and a second channel) 1008, with one channel 1008 at each lateral side of the cradle 1002.

Figure 11:
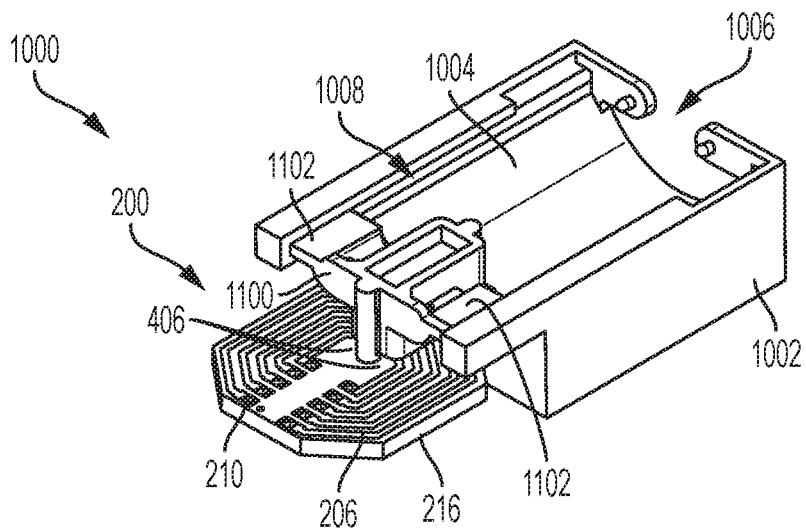
FIG. 11. is a perspective depiction of the FIG. 10 device, further including an electrical connector.

FIG. 11 depicts the FIG. 10 device after attachment of the cradle 1002 and the wiring assembly 200 to an electrical connector 1100, where the electrical connector 1100 is electrically coupled to each of the electrical contacts 210 through the plurality conductive traces 206, for example, through the plurality of conductive vias 300 (FIG. 3) or another technique. The electrical connector 1100 can include one or more pegs 406, where the one or more pegs 406 provide a similar attachment and alignment function as described with reference to FIG. 4. It will be appreciated that, in FIG. 4, the pegs 406 are inserted through holes 220 in a direction from the back surface 302 of the wiring assembly 200, while in FIG. 11 the pegs are inserted through holes 220 in a direction from the front surface 304 of the wiring assembly 200.

Further, the electrical connector 1100 can be electrically coupled to a cable, such as cable 502 (FIG. 5), where the cable provides similar functionality to cable 502 (not depicted in FIG. 11 for simplicity).

As further depicted in FIG. 11, the electrical connector 1100 includes a pair of opposing tabs (i.e., a first tab and a second tab) 1102, where each tab 1102 is inserted into, received by, and configured to slide back and forth along, one of the channels 1008. As the tabs 1102 slide back and forth within the channels 1008, the electrical connector 1100 slides back and forth within the recess 1006. Additionally, because the wiring assembly 200 is attached to the electrical connector 1100, the wiring assembly 200 can also slide back and forth within the recess 1006 defined by the curved surface 1004.

Figure 12:
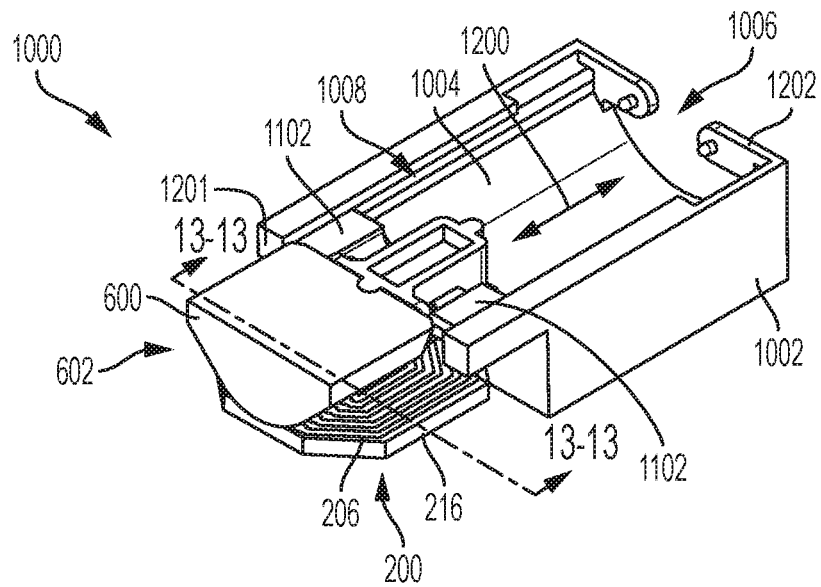
FIG. 12 is a perspective depiction of the FIG. 11 device in preparation for a read of a printed memory device attached to a structure.
Figure 13:
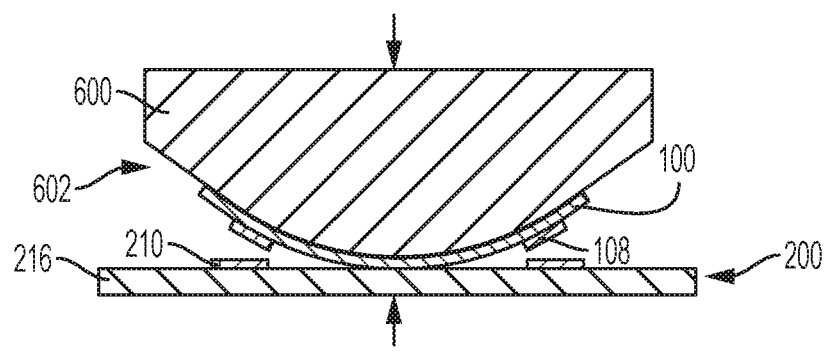
FIG. 13 is a cross section of the FIG. 12 device.

FIG. 12 is a perspective depiction, and FIG. 13 is a cross section along 13-13 of FIG. 12, of a portion of a structure 600 such as a replaceable component, for example, a toner bottle, having a curved surface 602 to which a printed memory 100 is attached. The depictions of FIGS. 12 and 13 are during an initial physical (but not electrical) contact of the printed memory 100 with the wiring assembly 200. Once the structure 600 and wiring assembly 200 are positioned relative to each other as depicted in FIGS. 12 and 13, the tabs 1102 are slid within the channels 1008 from a first end 1201 toward a second end 1202 opposite the first end 1201 of the cradle 1002. In one implementation, the cradle 1002 remains stationary while the structure 600, the electrical connector 1100, and the wiring assembly 200 attached to the electrical connector 1100 are moved toward the opposite end 1202 of the cradle 1002. In another implementation, the structure 600, the electrical connector 1100, and the wiring assembly 200 attached to the electrical connector 1100 remain stationary while the cradle 1002 is moved toward the structure 600 as the tabs 1102 slide within the channels 1008. In yet another implementation, both the cradle 1002 and the assembly including the structure 600, the wiring assembly 200, and the electrical connector 1100, are moved toward each other.

Figure 14:
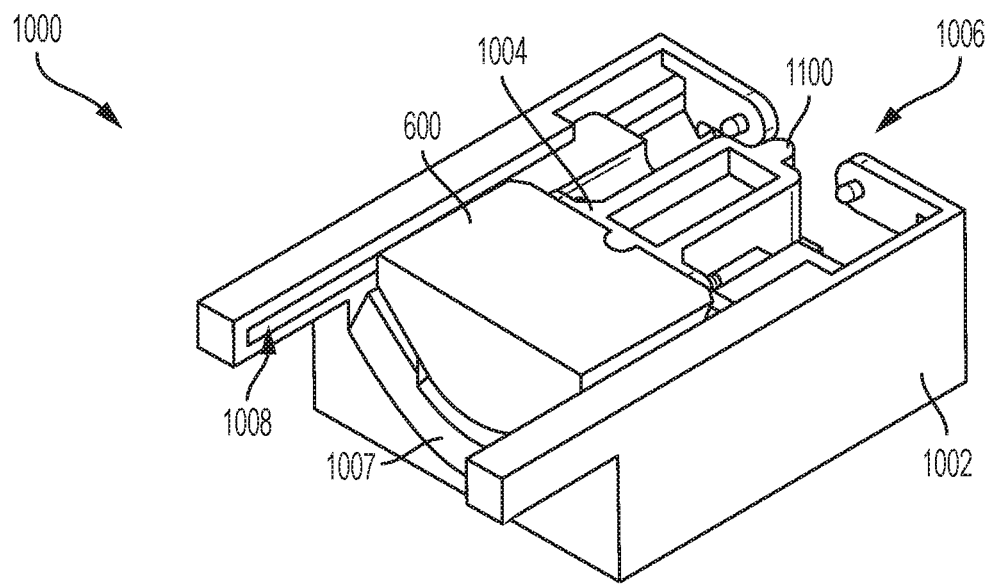
FIG. 14 is a perspective depiction of the FIG. 11 device where the printed memory and reader are positioned for a read operation.
Figure 15:
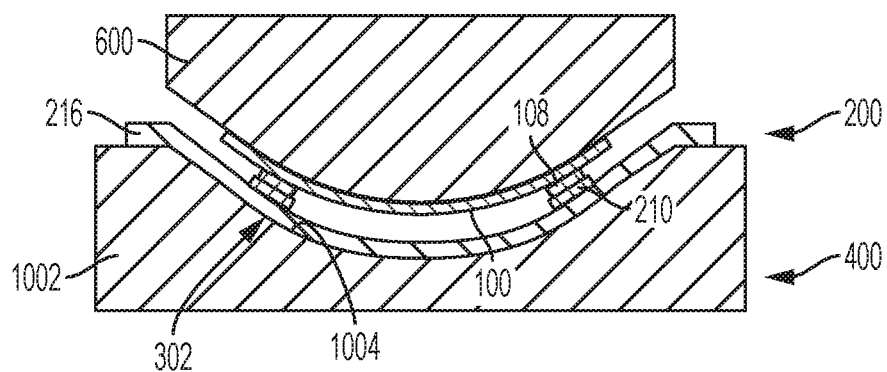
FIG. 15 is a cross section of the FIG. 14 device.

FIGS. 14 and 15 depict the structures of FIGS. 12 and 13 after the plurality of electrical contacts 210 of the wiring assembly 200 physically and electrically contact the plurality of contact pads 108 of the printed memory 100. As the tabs 1102 slide within the channels 1008 from the position of FIG. 12 to the position of FIG. 14, the back surface 302 of the wiring assembly 200 slides across the angled surface 1007 and onto the curved surface 1004. Simultaneously, at least a portion of the structure 600 is positioned within the recess 1006. As the back surface 302 slides onto the curved surface 1004, the wiring assembly 200 bends, flexes, and/or conforms to the curved surface 1004 and wraps around the printed memory 100 such that the electrical contacts 210 physically and electrically contact the contact pads 108. Thus the electrical contacts 210 physically contact the contact pads 108 without sliding across the contact pads 108, which would otherwise accelerate wear and possible damage of the contact pads 108. The wiring assembly 200 thus flexes from a first flat profile as depicted in FIG. 13 to a second curved profile as depicted in FIG. 15.

In the implementation of FIGS. 10-15, when the wiring assembly 200 and the printed memory 100 are moving relative to the cradle 1002, the surface of the printed memory 100 having the contact pads 108 moves in a direction parallel to a direction of movement of the front surface 304 of the wiring assembly 200.

FIG. 16 is a schematic depiction of an example host device 1600 in an implementation of the present teachings. It will be appreciated that a host device 1600 can include other features and/or structures that are not depicted for simplicity, while various depicted features and/or structures can be removed or modified. The host device 1600 can be or include, for example, a printer or another electronic device that can include a replaceable component 1602, for example, a customer replaceable component such as a toner cartridge, an ink cartridge, a fuser, or another printer part. Other fields that may benefit from an implementation to reduce or prevent counterfeiting, or for other uses, include industries such as cosmetics, comestibles, pharmaceuticals, filters, reagents, medical devices, interchangeable heads or other interchangeable parts for electronic devices or other tools, etc. Circuitry within and/or electrically coupled to the host device 1600 can include a host controller 1604, a security module 1606, a printed memory reader 1608 (e.g., a reader 400, 1000 described herein or another reader), and a printed memory 1610 (e.g., printed memory 100 as described herein or another authentication circuit) attached to the replaceable component 1602. In an implementation, upon an installation of the replaceable component 1602 and powering on the host device 1600, the host controller 1604 instructs the security module 1606 to perform a read operation of the printed memory 1610 on the replaceable component 1602. The read operation can include electrically coupling the printed memory reader 1608 with the printed memory 1610 as described herein, for example, using the wiring assembly 200. The security module 1606 compares data read from the printed memory 1610 using the printed memory reader 1608 to expected data from, for example, a lookup table stored in the security module 1606. If the read data matches the expected data, the security module 1606 instructs the host controller 1604 to enable functionality of the host device 1600. If the read data does not match the expected data, the security module 1606 instructs the host controller 1604 to disable functionality of the host device 1600.

It will be appreciated that the security module 1606 may enable or disable device functionality directly, and that other operational methods resulting in the same or similar outcomes are contemplated. It will also be appreciated that while the present teachings are discussed for illustration purposes relative to a read operation of a printed memory, a reader in accordance with the present teachings may be an electrical device reader that is used to read and/or write and/or monitor and/or perform another operation on or from an electrical device other than printed memory, for example, for use during a transfer of data to and/or from an integrated circuit, a logic device, a microprocessor, other types of memory devices, a printed circuit board, etc., through the wiring assembly 200.

Figure 17:
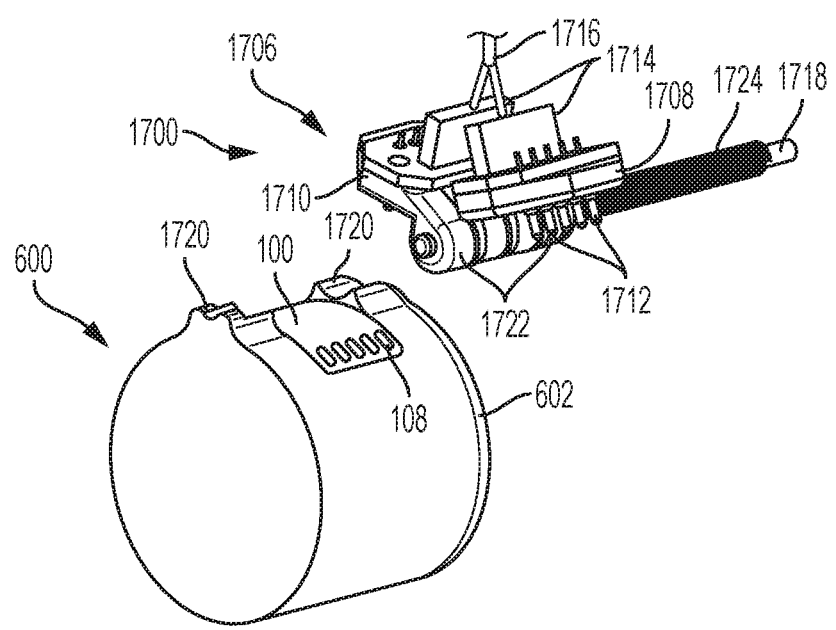
FIG. 17 is a perspective depiction of another implementation of the present teachings.
Figure 19:
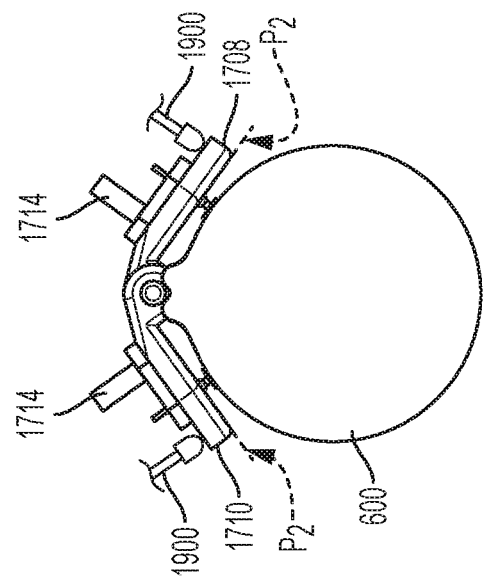
FIG. 19 is an end view of the FIG. 17 structure in a second position.
Figure 18:
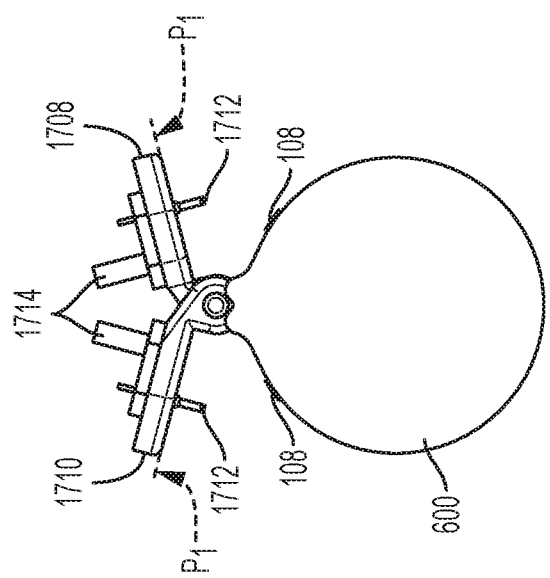
FIG. 18 is an end view of the FIG. 17 structure in a first position.

FIGS. 17-19 depict another implementation of a wiring assembly 1700 that conforms to a shape of an article or structure 600 such as a replaceable component having a curved surface 602 to which a printed memory 100 is attached. The wiring assembly 1700 can include a flexible substrate 1706 that includes a rigid first portion 1708 and a rigid second portion 1710 configured to cooperatively engage the printed memory 100 with a plurality of electrical contacts 1712, for example, spring-loaded electrical contacts. While this implementation is described relative to two rigid portions, a wiring assembly having a flexible substrate that includes more than two rigid portions is contemplated. Each electrical contact 1712 of the plurality of electrical contacts 1712 can be directly electrically coupled with one or more electrical connectors 1714, or can be electrically coupled using electrically conductive traces (not individually depicted for simplicity). The electrical connectors 1714 can be electrically coupled to, for example, a security module 1606 (FIG. 16) through one or more cables 1716.

The wiring assembly 1700 can be mounted to a shaft 1718 that positions the wiring assembly 1700 within the host device 1600 (FIG. 16). Upon positioning the structure 600 within the host device 1600, the structure 600, and more particularly the printed memory 100 positioned on the structure 600, can be aligned with the wiring assembly 1700 using any suitable technique such that the electrical contacts 1712 of the wiring assembly 1700 are positioned relative to the contact pads 108 of the printed circuit 100. In one implementation, for example, one or more alignment grooves 1720 defined by the structure 600 can mate with one or more contours 1722 of the wiring assembly 1700 as depicted in FIG. 18 to align the electrical contacts 1712 with the contact pads 108. FIG. 17 further depicts a positioner 1724 (e.g., a spring) that elastically maintains the first portion 1708 and the second portion 1710 of the wiring assembly 1700 in a first position depicted in FIGS. 17 and 18, but allows the wiring assembly 1700 to be repositioned into a second position depicted in FIG. 19 as discussed below.

During or after the positioning and alignment of the printed memory 100 with the electrical contacts 1712 as depicted in FIG. 18, the wiring assembly 1700, and more particularly the first portion 1708 and second portion 1710 of the flexible substrate 1706, can engage with a driver mechanism 1900 which repositions the flexible substrate 1706 from the first position as depicted in FIG. 18 to the second position as depicted in FIG. 19. In this implementation, the driver mechanism 1900 includes a pair of guides that engage with the first portion 1708 and second portion 1710 of the flexible substrate 1706 during or after the positioning of the structure 600. Other driver mechanisms, for example, electromechanical driver mechanisms, are contemplated. During the repositioning, the flexible substrate 1706 pivots and articulates about a pivot point provided by the shaft 1718 to provide the flexible substrate of the wiring assembly 1700. The wiring assembly 1700 thus flexes and/or articulates from a first profile "N" as depicted in FIG. 18 to a second profile "$P_2$" as depicted in FIG. 19, where the second profile is different from the first profile. The flexible substrate 1706, including the first portion 1708 and the second portion 1710, is thus configured as a flexible substrate that supports the electrical contacts 1712. In FIG. 18, profile $P_1$ defines an angle greater than 180° while in FIG. 19 profile $P_2$ defines an angle less than 180°, although other implementations are contemplated. When in the FIG. 19 position, the electrical contacts 1712 physically and electrically contact the contact pads 108 of the printed memory, and thus the wiring assembly 1700 can be used to perform a memory operation on the printed memory 100.

After performing the memory operation, the driver mechanism 1900 can release the first portion 1708 and second portion 1710 of the wiring assembly 1700, and the positioner 1724 repositions the wiring assembly 1700 into the first position of FIG. 17. This can occur, for example, when the structure 600 is removed from the host device 1600 by a user, or at any other desired time after performing the memory operation.

Figure 20:
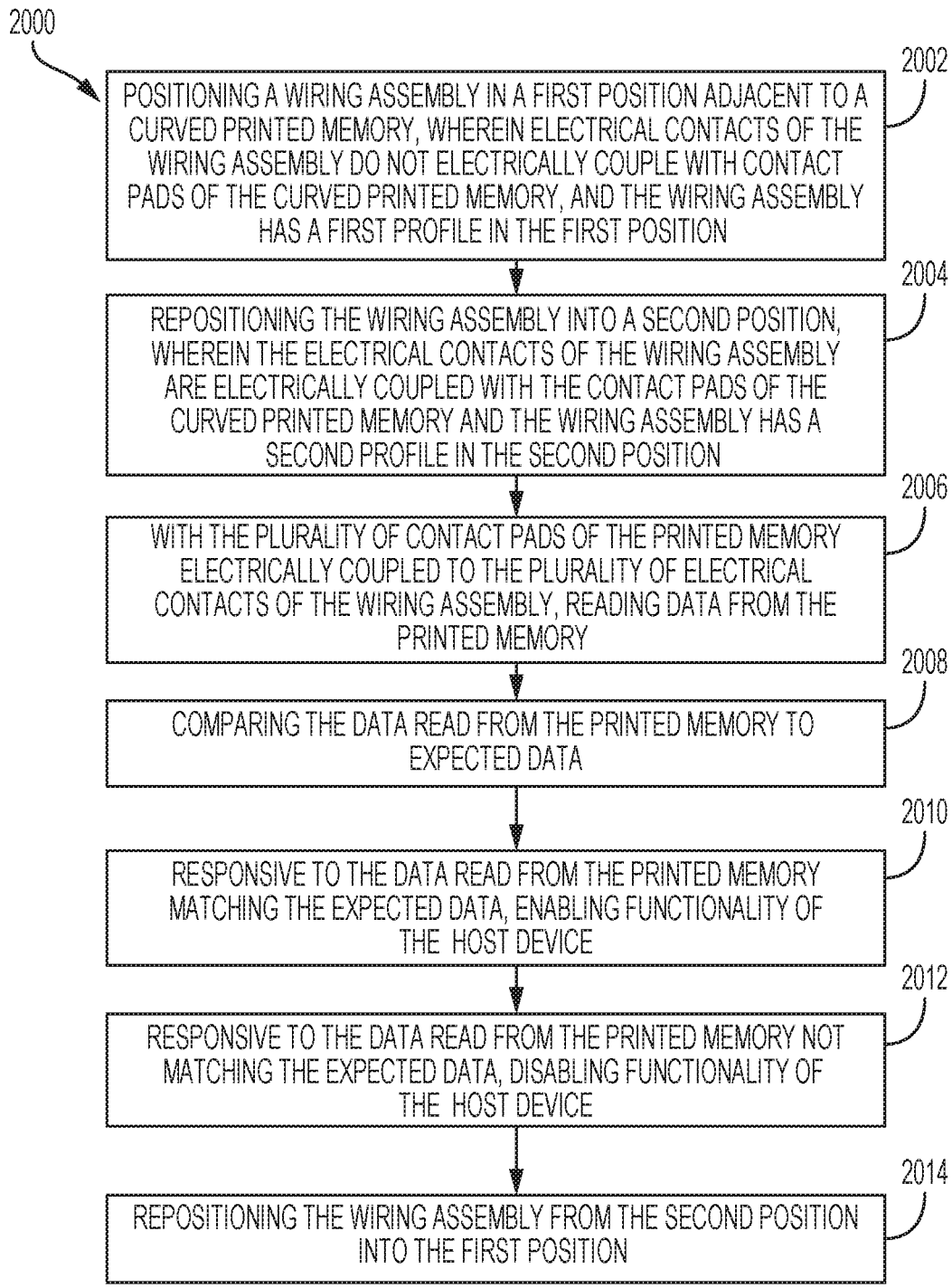
FIG. 20 is a flow chart depicting a method for authenticating a replaceable component in a host device.

A process or method 2000 for authenticating a replaceable component of a host device is depicted in the flow chart of FIG. 20. The method 2000 can proceed by operation or use of one or more of the structures depicted in the figures described above, and thus is described with reference to one or more of the previous figures; however, it will be appreciated that the method 2000 is not limited to any particular structure or use unless expressly stated herein. It will be appreciated that while the method 2000 is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been depicted for simplicity, while other illustrated acts or events can be removed or modified.

In an implementation of the method 2000 for authenticating a replaceable component 600 of a host device 1600, a wiring assembly 200, 1700 in a first position can be positioned adjacent to a curved printed memory 100, wherein electrical contacts 210, 1712 of the wiring assembly 200, 1700 do not electrically couple with the contact pads 108 of the printed memory as at 2002. Further, in the first position, the wiring assembly has a first profile (see, for example, FIGS. 6, 7, 12, 13, and 18). Next, at 2004, the wiring assembly 200, 1700 is repositioned into a second position, wherein the electrical contacts 210, 1712 of the wiring assembly 200, 1700 are electrically coupled with the contact pads 108 of the curved printed memory 100 and the wiring assembly 200, 1700 has a second profile in the second position (see, for example, FIGS. 8, 9, 14, 15, 18). At 2006, with the plurality of contact pads 108 of the printed memory 100 electrically coupled to the plurality of electrical contacts 210, 1712 of the wiring assembly 200, 1700, data can be read from the printed memory 100. It will be appreciated that in other implementations, a different memory operation can be performed exclusive of, or in addition to, the read operation of the printed memory 100.

Next, the data read from the printed memory can be compared to expected data, for example, using the security module 1606, the host controller 1604, or another component of the host device 1600 (FIG. 16), as at 2008. At 2010, responsive to the data read matching the expected data, functionality of the host device 1600 can be enabled, for example, by or using the security module 1606. At 2012, responsive to the data read not matching the expected data, functionality of the host device 1600 can be disabled, for example, by or using the security module 1606. During the method 1700, the wiring assembly 200, 1700 can be repositioned from the second position to the first position as at 2014.

It will be appreciated that while the present teachings are discussed with regard to a reader for performing a memory operation on a printed memory that may be attached to a curved surface, other uses are contemplated. For example, a reader in accordance with the present teachings may be used with any electrical device such as an electrical device including a removable or consumable object, wherein the electrical device electrically connects to the reader at a plurality of contact points and sliding contact is undesirable. Without limiting, the reader is particularly useful when contact pads of a device being read, written, monitored, etc., can be worn and/or damaged by a sliding contact with contact pads, probes, pins, etc., of a reader. This can occur, for example, in a device design when the contact pads are part of, or positioned on, or positioned as, a curved surface, as well as in other device designs.

It will be further appreciated that while the present teachings are discussed relative to a wiring assembly having a flat profile being flexed into a curved profile, other implementations of the present teachings are contemplated. Generally, the wiring assembly has a first profile when electrical contacts of the wiring assembly are not electrically coupled to contact pads of an electrical device, and the wiring assembly has a second profile that is different than the first profile when the electrical contacts of the wiring assembly are electrically coupled to contact pads of the electrical device. In a natural, unflexed, free, or unconnected state, the wiring assembly may have a first profile that is other than flat, such as curved in a first direction or by a first amount. In a flexed, bent, or connected state, the wiring assembly may have a second profile that is different than the first profile, such as curved in a second direction that is different than the first direction, or curved by a second amount that is different than the first amount. The first and/or second profiles can be other than curved or flat, such as doubly curved or some other configuration. Additionally, "curved" can include any shape of a surface not constrained to planar, including cylindrical, piecewise planar, varying curvature, multiply curved shapes such as double-curved shapes, etc.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An electrical device reader, comprising:
a wiring assembly, comprising:
a flexible substrate; and
a plurality of electrical contacts supported by the flexible substrate;
an electrical connector electrically coupled with the plurality of electrical contacts; and
a cradle positioned relative to the electrical connector and comprising a curved surface that defines a recess in the cradle,
wherein the wiring assembly is configured to flex from a first profile in which the plurality of electrical contacts are not electrically coupled with a plurality of contact pads of an electrical device into a second profile in which the plurality of electrical contacts are electrically coupled with the plurality of contact pads of the electrical device; and
wherein the wiring assembly is configured to flex and conform to the curved surface of the cradle and into a curved profile during a transfer of data from and/or to an electrical device through the wiring assembly.

2. The electrical device reader of claim 1, wherein the first profile is a flat profile and the second profile is a curved profile.

3. The electrical device reader of claim 1, wherein:
the cradle defines a first channel and a second channel;
the electrical connector comprises a first tab and a second tab;
the first tab is positioned within the first channel;
the second tab is positioned within the second channel; and
the first and second tabs are configured to slide within the first and second channels.

4. The electrical device reader of claim 3, wherein the electrical connector is configured to slide back and forth within the recess defined by the curved surface of the cradle.

5. The electrical device reader of claim 1, wherein the flexible substrate comprises a flexible underlayer, wherein the flexible underlayer includes one or more of a synthetic foam, a urethane foam, a urethane foam rubber, and felt.

6. The electrical device reader of claim 1, wherein:
the electrical connector comprises a first carriage and a second carriage;
the cradle comprises a first slot and a second slot; and
the first and second carriages are positioned within the first and second slots, thereby constraining movement of the electrical connector relative to the cradle along a path.

7. An electronic device, comprising:
a replaceable component comprising a curved surface;
an electrical device attached to the curved surface of the replaceable component and having a curved profile;
an electrical device reader, comprising:
a wiring assembly, comprising:
a flexible substrate; and
a plurality of electrical contacts supported by the flexible substrate; and
an electrical connector electrically coupled with the plurality of electrical contacts and
a cradle positioned relative to the electrical connector and comprising a curved surface that defines a recess in the cradle,
wherein the wiring assembly is configured to flex from a first profile in which the plurality of electrical contacts are not electrically coupled with a plurality of contact pads of the electrical device into a second profile in which the plurality of electrical contacts are electrically coupled with the plurality of contact pads of the electrical device; and
wherein the wiring assembly is configured to flex and conform to the curved surface of the cradle into a curved profile during a transfer of data from and/or to an electrical device through the wiring assembly.

8. The electronic device of claim 7, wherein:
the first profile is a flat profile and the second profile is a curved profile
the cradle defines a first channel and a second channel;
the electrical connector comprises a first tab and a second tab;
the first tab is positioned within the first channel;
the second tab is positioned within the second channel; and
the first and second tabs are configured to slide within the first and second channels.

9. A method for authenticating a replaceable component of a host device, comprising:
positioning a wiring assembly in a first position adjacent to a curved printed memory, wherein a plurality of electrical contacts of the wiring assembly do not electrically couple with a plurality of contact pads of the curved printed memory, and the wiring assembly has a first profile in the first position;
repositioning the wiring assembly into a second position, wherein the plurality of electrical contacts of the wiring assembly are electrically coupled with the plurality of contact pads of the curved printed memory and the wiring assembly has a second profile in the second position;
with the plurality of contact pads electrically coupled to the plurality of electrical contacts, reading data from the curved printed memory;
comparing the data read from the curved printed memory to expected data;
responsive to the data read from the curved printed memory matching the expected data, enabling functionality of the host device; and
responsive to the data read from the curved printed memory not matching the expected data, disabling functionality of the host device.

10. The method of claim 9, wherein the repositioning of the wiring assembly into the second position comprises flexing a flexible underlayer of the wiring assembly from a flat profile to a curved profile.

11. The method of claim 9, wherein the repositioning of the wiring assembly into the second position comprises articulating a rigid first portion of the wiring assembly and at least a rigid second portion of the wiring assembly between the first position and the second position.

12. The method of claim 11, further comprising:
engaging the rigid first portion and the rigid second portion with a driver mechanism thereby repositioning the rigid first portion and the rigid second portion from the first position to the second position; and
repositioning the wiring assembly from the second position into the first position using a positioner that elastically maintains the rigid first portion and the rigid second portion in the first position.

13. An electrical device reader, comprising:
a wiring assembly, comprising:

a flexible substrate comprising a rigid first portion and at least a rigid second portion; and a plurality of electrical contacts supported by the flexible substrate;

an electrical connector electrically coupled with the plurality of electrical contacts; and a shaft that provides a pivot point, wherein:

the wiring assembly is mounted to the shaft; and the rigid first portion and the rigid second portion of the flexible substrate are configured to pivot about the pivot point provided by the shaft between a first position in which the plurality of electrical contacts are not electrically coupled with a plurality of contact pads of an electrical device and a second position in which the plurality of electrical contacts are electrically coupled with the plurality of contact pads of the electrical device.

14. The electrical device reader of claim 13, further comprising a positioner that elastically maintains the wiring assembly in the first position and allows the wiring assembly to be repositioned into the second position.

15. The electrical device reader of claim 14, wherein the positioner is a spring that encircles the shaft.

16. The electrical device reader of claim 13, wherein the plurality of electrical contacts comprise a plurality of spring-loaded electrical contacts.

17. The electrical device reader of claim 16, further comprising a driver mechanism configured to reposition the flexible substrate from the first position to the second position.

18. The electrically device reader of claim 13, wherein:

the rigid first portion and the rigid second portion form an angle relative to the pivot point;

the angle is greater than 180° when the rigid first portion and the rigid second portion are in the first position; and the angle is less than 180° when the rigid first portion and the rigid second portion are in the second position.

* * * * *